(12) United States Patent
Kim et al.

(10) Patent No.: US 11,224,011 B2
(45) Date of Patent: *Jan. 11, 2022

(54) METHOD FOR SUPPORTING NAS SIGNALING BY BASE STATION IN WIRELESS COMMUNICATION SYSTEM AND APPARATUS THEREFOR

(71) Applicant: LG ELECTRONICS INC., Seoul (KR)

(72) Inventors: Laeyoung Kim, Seoul (KR); Hyunsook Kim, Seoul (KR); Jinsook Ryu, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,912

(22) Filed: Apr. 17, 2020

(65) Prior Publication Data

US 2020/0245237 A1 Jul. 30, 2020

Related U.S. Application Data

(63) Continuation of application No. 16/064,835, filed as application No. PCT/KR2017/007027 on Jul. 3, 2017, now Pat. No. 10,652,812.

(Continued)

(51) Int. Cl.
*H04W 48/18* (2009.01)
*H04W 88/10* (2009.01)
*H04W 48/08* (2009.01)

(52) U.S. Cl.
CPC ............ *H04W 48/18* (2013.01); *H04W 88/10* (2013.01)

(58) Field of Classification Search
CPC .............................. H04W 48/18; H04W 88/10
(Continued)

(56) References Cited

U.S. PATENT DOCUMENTS 10,652,812 B2 * 5/2020 Kim ..................... H04W 48/18
2009/0010173 A1 * 1/2009 Kim ................. H04W 52/0216
370/250

(Continued)

FOREIGN PATENT DOCUMENTS

JP         2006174447 A       6/2006
KR    10-2013-0143098 A     12/2013
(Continued)

OTHER PUBLICATIONS

R3-161132, XP051105936: 3GPP TSG-RAN3 Meeting #92, Nanjing, China, May 23-27, 2016, Huawei, "Evolved LTE to connect to the new core," pp. 1-4.

(Continued)

*Primary Examiner* — Inder P Mehra
(74) *Attorney, Agent, or Firm* — Dentons US LLP

(57) ABSTRACT

An embodiment of the present invention provides a method for supporting non-access stratum (NAS) signaling of a user equipment (UE) by a base station in a wireless communication system, the method comprising the steps of: transmitting, to the UE, information for supporting a connection to a next generation (NG) core; receiving a NAS-related message from the UE; performing one of MME selection and AMF selection according to whether the NAS-related message includes information regarding the use of NAS; and transmitting an NAS message to an MMF or an AMF which is determined as a result of performing one of the MME selection and the AMF selection.

20 Claims, 9 Drawing Sheets

Related U.S. Application Data

(60) Provisional application No. 62/358,058, filed on Jul. 4, 2016, provisional application No. 62/510,279, filed on May 24, 2017.

(58) Field of Classification Search
USPC .................................................. 455/435.2
See application file for complete search history.

(56) References Cited

U.S. PATENT DOCUMENTS

| | | | | |
|---|---|---|---|---|
| 2012/0221693 | A1 | 8/2012 | Cutler | H04M 15/66 709/223 |
| 2014/0211728 | A1 | 7/2014 | Zembutsu et al. | |
| 2014/0301495 | A1* | 10/2014 | Sohn | H01Q 1/246 375/267 |
| 2015/0146519 | A1* | 5/2015 | Zakrzewski | H04W 24/04 370/221 |
| 2016/0128051 | A1 | 5/2016 | Zembutsu et al. | |
| 2017/0289882 | A1* | 10/2017 | Faccin | H04L 45/22 |
| 2018/0270894 | A1* | 9/2018 | Park | H04W 76/27 |
| 2018/0314534 | A1 | 11/2018 | Jahanbanifar | G06F 8/10 |
| 2019/0007936 | A1* | 1/2019 | Chen | H04L 29/06 |
| 2019/0037531 | A1* | 1/2019 | Pantus | H04W 48/16 |
| 2019/0150219 | A1 | 5/2019 | Wang | H04W 76/19 |
| 2019/0350035 | A1 | 11/2019 | Kim | H04W 76/10 |
| 2021/0144539 | A1* | 5/2021 | Edge | H04W 88/16 |

FOREIGN PATENT DOCUMENTS

| | | |
|---|---|---|
| KR | 1020150083406 | 7/2015 |
| KR | 1020150083406 A | 7/2015 |
| KR | 1020160068840 | 6/2016 |
| KR | 1020160068840 A | 6/2016 |
| WO | 2015133078 A1 | 9/2015 |

OTHER PUBLICATIONS

S2-162953, XP051108828: SA WG2 Meeting #115, May 23-27, 2016, Nanjing, P.R. China, Deutsche Telekom AG, AT&T, "Proposal to study alternative non-AS signalling methods," pp. 1-6.

S2-171883: SA WG2 Meeting #120, Mar. 26-31, 2017, Busan, Korea, Telecom Italia, AT&T, Nokia, NTT Docomo, "TS 23.501: P-CR to fix Interworking architecture," pp. 1-8.

"3GPP, TSG SA; General Packet Radio Service (GPRS) Enhancement for Evolved Universal Terrestrial Radio Access Network (E-UTRAN) Access (Release 14)", 3GPP TS 23.401 V14.0.0, Jun. 22, 2016.

"3GPP; TSG SA; Study on Architecture for Next Generation System (Release 14)," 3GPP TR 23.799 V0.5.0, Jun. 8, 2016, see section 6.6.1.2.

"3rd Generation Partnership Project; Technical Specification Group Services and System Aspects; Study on Architecture for Next Generation System (Release 14)," 3GPP TR 23.799 V0.5.0 (Jun. 8, 2016).

"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0 (Jun. 22, 2016).

ETRI, "TS 23.502 Network initiated service request procedure for N3GPP PDU session", SA WG2 Meeting #122, Jun. 26-30, 2017, S2-174870.

"Study on Architecture for Next Generation System", 3GPP TR 23.799 V1.1.0, Oct. 25, 2016, pp. 415-417.

* cited by examiner

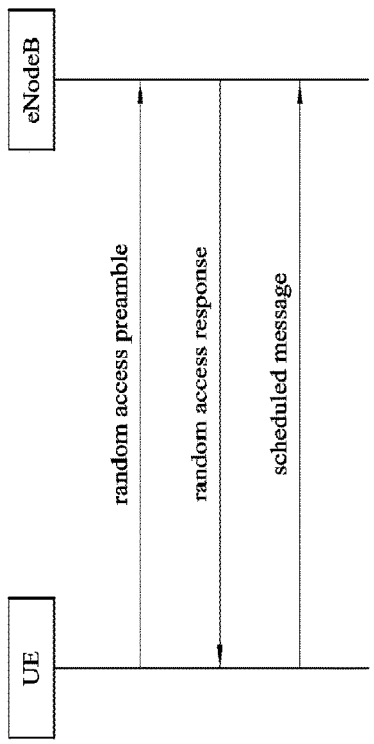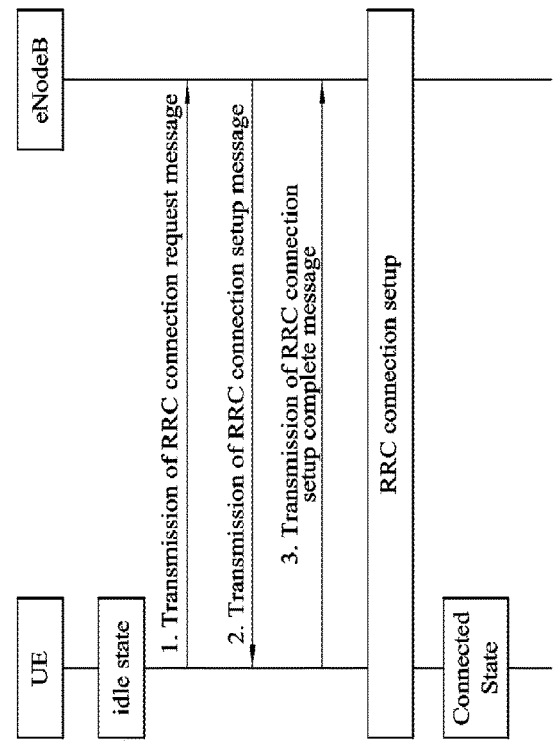

METHOD FOR SUPPORTING NAS SIGNALING BY BASE STATION IN WIRELESS COMMUNICATION SYSTEM AND APPARATUS THEREFOR

This application is a continuation application of U.S. patent application Ser. No. 16/064,835 filed on Oct. 12, 2018, which is a National Stage Entry of International Application No. PCT/KR2017/007027 filed on Jul. 3, 2017, and claims priority to U.S. Provisional Application Nos. 62/358,058 filed on Jul. 4, 2016 and 62/510,279 filed on May 24, 2017, all of which are hereby incorporated by reference in their entireties as if fully set forth herein.

TECHNICAL FIELD

The following description relates to a wireless communication system, and more particularly, to a method for supporting NAS signaling by a base station simultaneously connected to an EPC and a next generation core and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide efficient support of NAS signaling by a base station simultaneously connected to an EPC and a next generation core.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for supporting non-access stratum (NAS) signaling of a user equipment (UE) by a base station in a wireless communication system comprises the steps of transmitting, to the UE, information for supporting a connection to a next generation (NG) core; receiving a NAS-related message from the UE; performing MME selection or AMF selection depending on whether the NAS-related message includes NAS usage related information; and transmitting an NAS message to an MMF or an AMF which is determined as a result of the MME selection or the AMF selection.

In one embodiment of the present invention, a base station for supporting non-access stratum (NAS) signaling of a UE in a wireless communication system comprises a transceiving module; and a processor, wherein the processor transmits, to the UE, information for supporting a connection to a next generation (NG) core through the transceiving module, receives a NAS-related message, performs MME selection or AMF selection depending on whether the NAS-related message includes NAS usage related information, and transmits an NAS message to an MMF or an AMF which is determined as a result of the MME selection or the AMF selection.

The NAS usage related information may be information indicating that NG NAS is used or information indicating EPC NAS is not used.

The AMF selection may include one or more of selection of a function of the NG core other than the AMF as a serving node of the UE, selection of the AMF as a serving node of the UE, transmission of the NAS message to the function of the NG core, transmission of the NAS message through N2 interface and transmission of the NAS message through an interface connected to the AMF.

The MME selection may include one or more of selection of a node of an EPC other than the MME as a serving node of the UE, selection of the MME as a serving node of the UE, transmission of the NAS message to the MME, and transmission of the NAS message through N1 interface.

The base station may perform MME selection if the NAS usage related information is not included in the NAS-related message.

The base station may perform AMF selection if the NAS usage related information is included in the NAS-related message.

The base station may perform AMF selection if the NAS usage related information is included in the NAS-related message and is information indicating that NG NAS is used or information indicating that EPC NAS is not used.

The base station may perform MME selection if the NAS usage related information is included in the NAS-related message and is information indicating that NG NAS is not used or information indicating that EPC NAS is used.

The base station may be connected to both of EPC and NG core.

The UE may be a UE which supports NG NAS.

The NAS-related message may be RRC (Radio Resource Control) message.

The NAS-related message may be a message which includes one or more of the NAS usage related information and the MAS message.

The base station may select AMF of a PLMN selected by the UE if the base station is shared by a plurality of PLMNs.

Advantageous Effects

According to the present invention, a base station simultaneously connected to an EPD and a next generation core may efficiently support NAS signaling.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a flow chart illustrating a random access procedure.

FIG. 6 is a diagram illustrating a connection procedure in a radio resource control (RRC) layer.

BEST MODE FOR CARRYING OUT THE INVENTION

Figure 1:
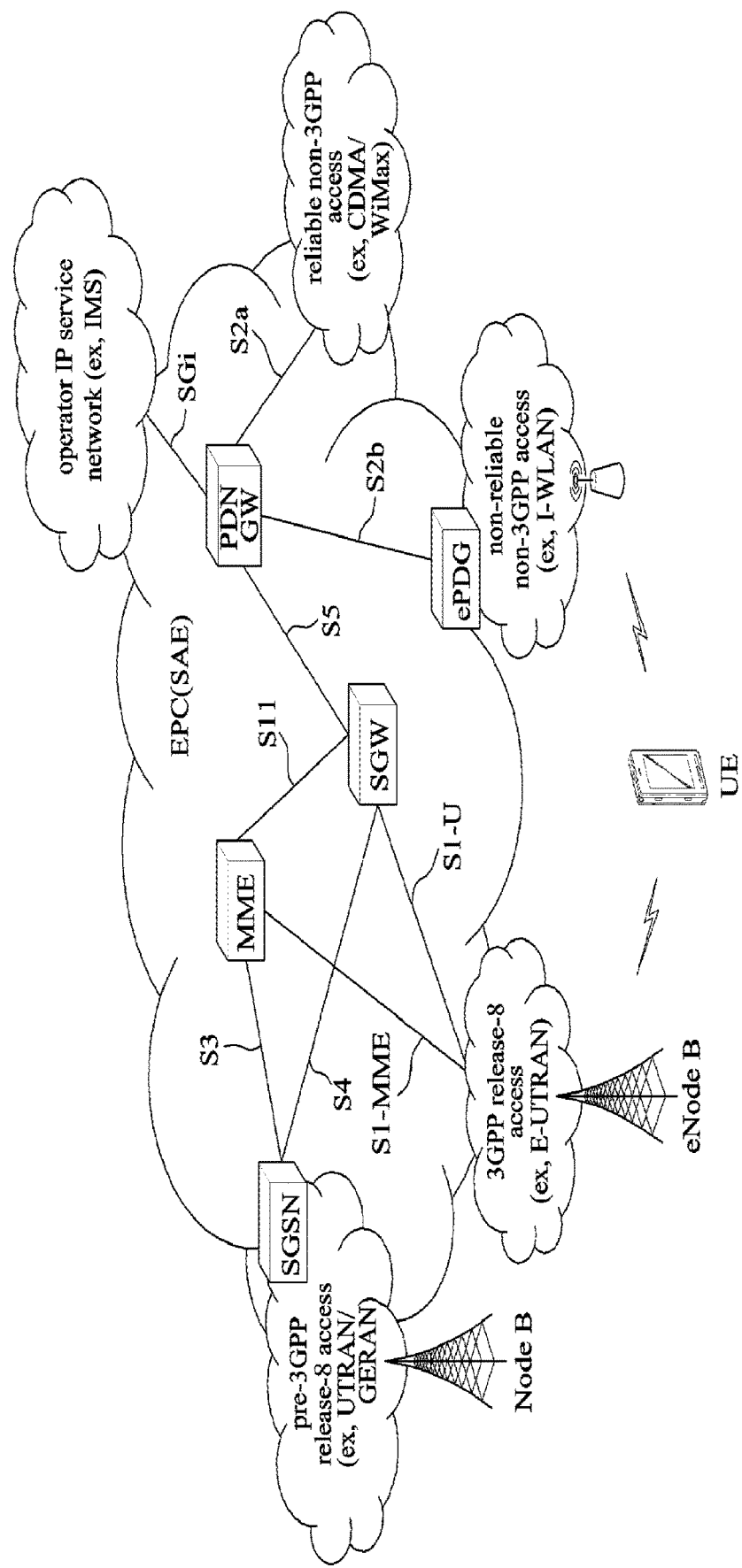
FIG. 1 is a diagram illustrating a brief structure of an evolved packet system (EPS) that includes an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
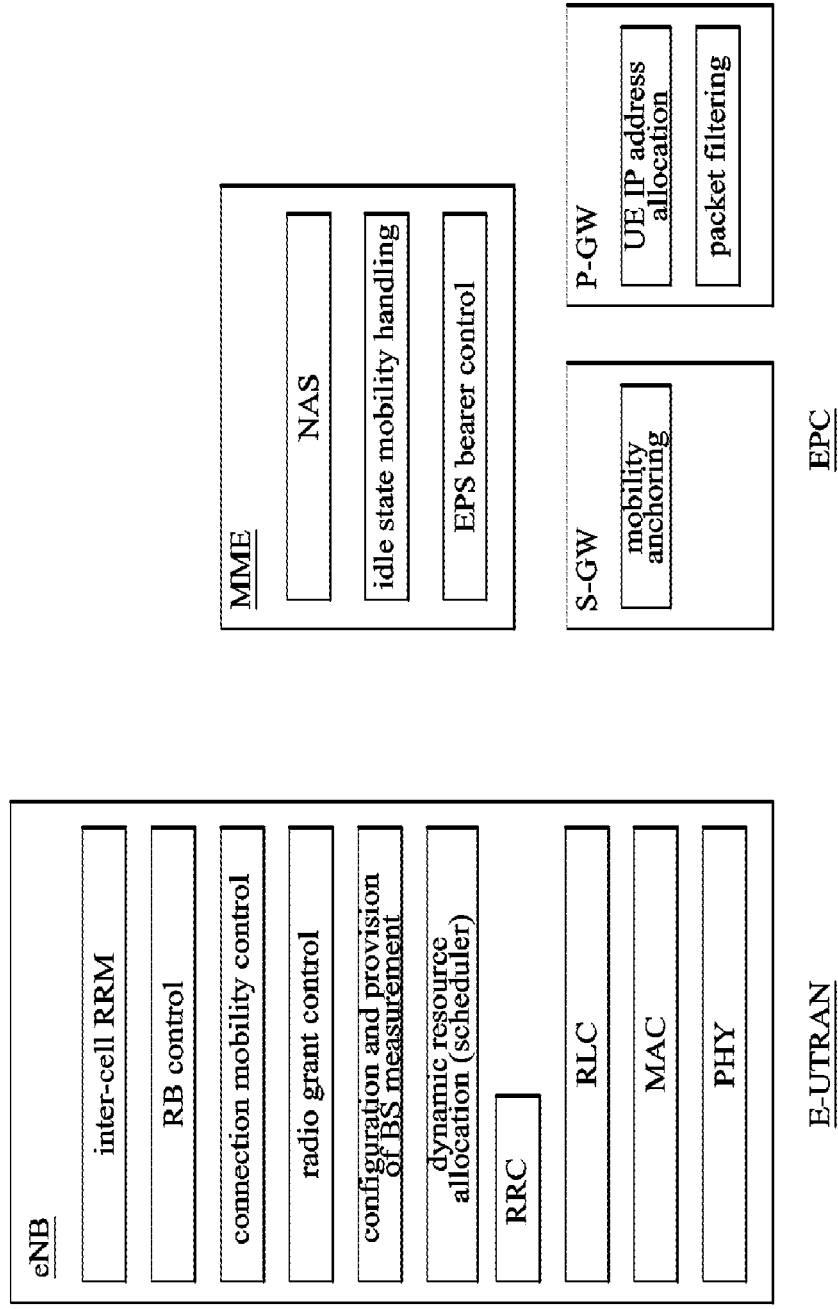
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
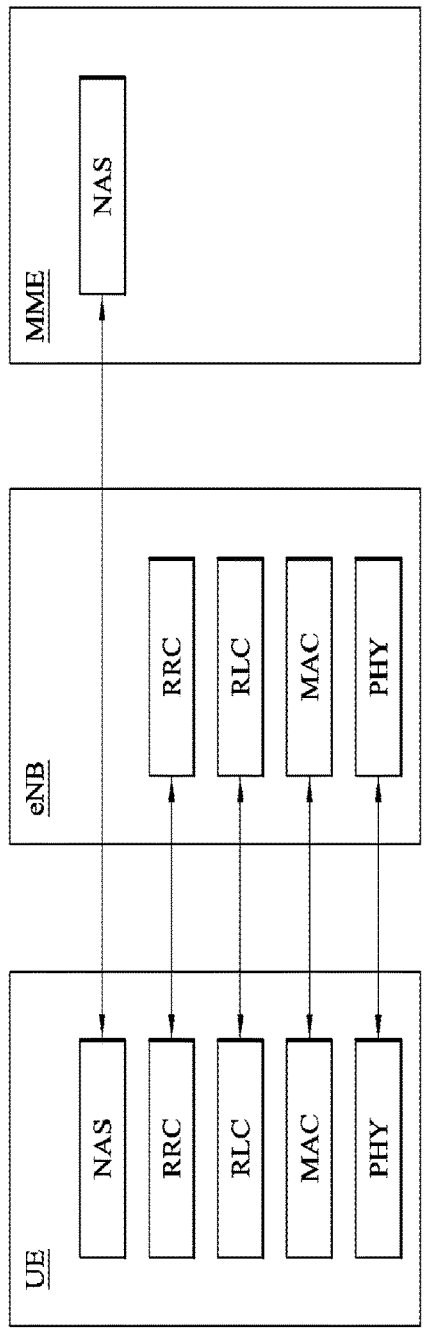
FIG. 3 is an exemplary diagram illustrating a structure of a radio interface protocol on a control plane.
Figure 4:
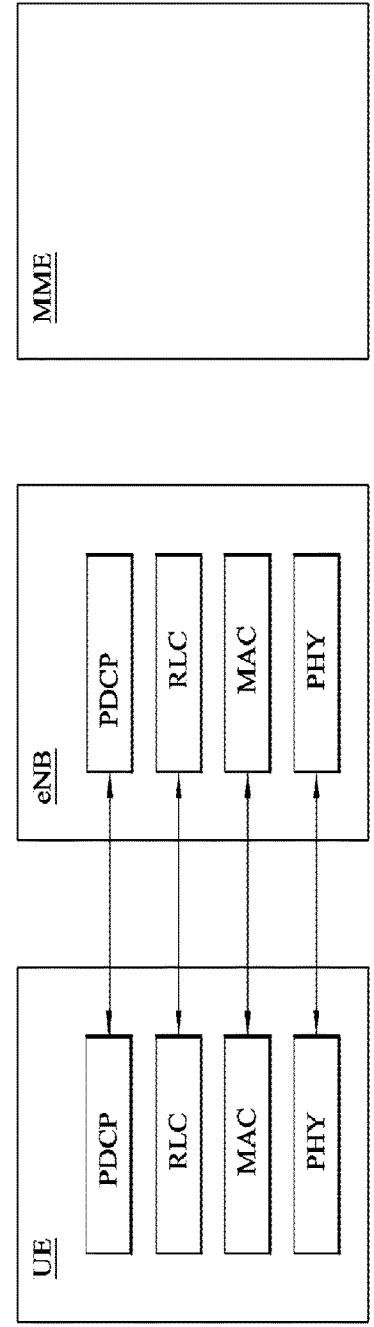
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
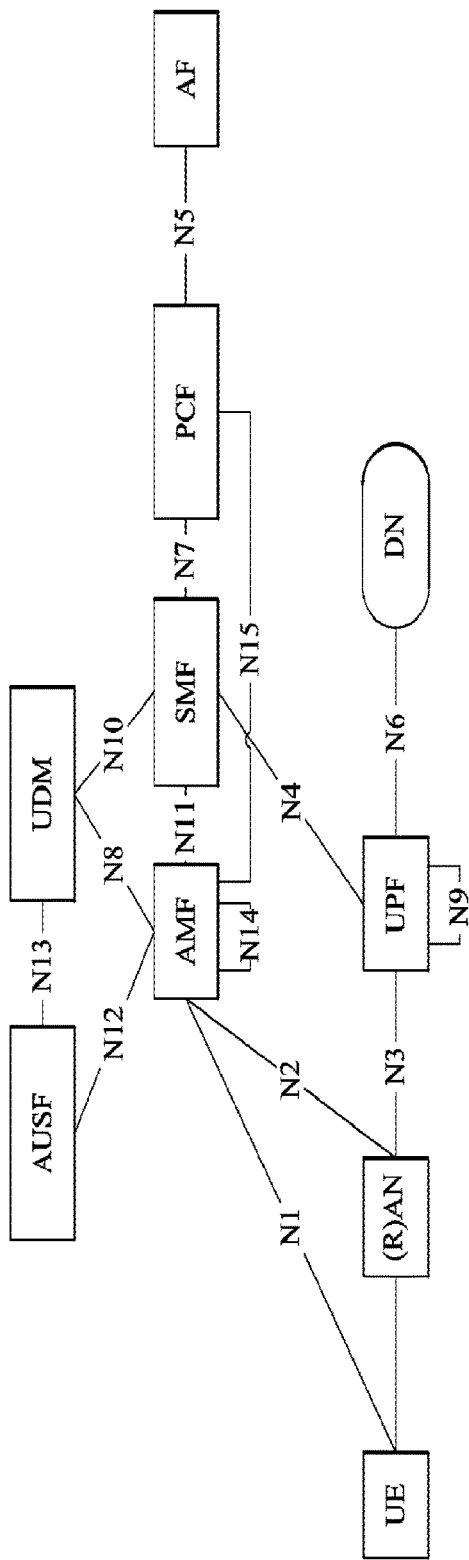
FIGS. 7 to 9 are diagrams illustrating a next generation system.

MME in the legacy EPC is divided into AMF (Access and Mobility Management Function) and SMF (session Management Function) in a next generation system (or 5G core network (CN)). Therefore, the AMF performs NAS interaction and MM (Mobility Management) with the UE and the SMF performs SM (Session Management). Also, the SMF manages a UPF (User plane Function) which is a gateway having a user-plane function, that is, for routing user traffic. In this case, a control-plane portion of S-GW and P-GW in the legacy EPC may be managed by the SMF, and a user-plane portion may be managed by the UPF. For routing of user traffic, one or more UPFs may exist between RAN and DN (Data Network). That is, the legacy EPC may be configured in 5G as illustrated in FIG. 7. Also, as a concept corresponding to PDN connection in the legacy EPS, a PDU (Protocol Data Unit) session is defined in the 5G system. The PDU session refers to association between a UE, which provides PDU connectivity services of Ethernet type or unstructured type as well as IP type, and a DN. In addition, a UDM (Unified Data Management) performs a function corresponding to HSS of EPC, and PCF (Policy Control Function) performs a function corresponding to PCRF of the EPC. To satisfy requirements of the 5G system, the functions may be provided in an enlarged type. Details of the 5G system architecture, each function and each interface follows TS 23.501.

Figure 8:
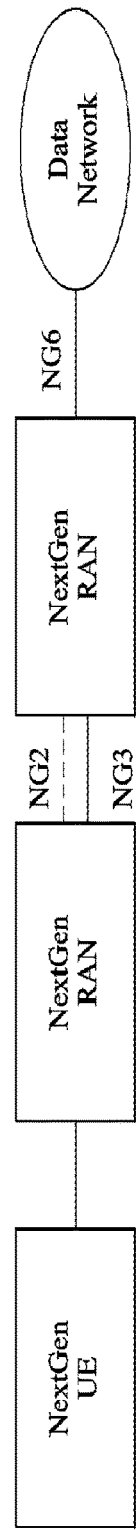

A higher layer structure of NextGen RAN is shown in FIG. 8. In this case, NextGen RAN means evolved E-UTRA and/or new radio access technologies, and a radio access network for supporting an interface with a NextGen core. NextGen UE (NG UE) refers to a UE which is connected to NextGen system. A system which includes NextGen RAN and NextGen Core may be referred to as NextGen System (NG System). Evolved E-UTRA is RAT indicating evolution of an E-UTRA radio interface for being operated in the NextGen system. Evolved E-UTRAN is upgraded to allow the E-UTRAN to provide an interface with the NextGen core, and includes the Evolved E-UTRA.

As will be aware of it from the above definition, it is considered that E-UTRAN as well as a new radio access supports connection to NG core. Such an E-UTRAN, that is, E-UTRAN for supporting an interface to NG core has been referred to as the Evolved E-UTRAN. Hereinafter, the E-UTRAN is simply referred to as eLTE, eE-UTRAN, etc. Also, E-UTRAN for supporting an interface to NG core and the legacy E-UTRAN for not supporting an interface to NG core will be referred to as LTE base station or base station.

eLTE may be connected to all of CN(Core Network), EPC and NG core, or may be connected to the NG core only. The former case means that eLTE is connected with the EPC through S1-MME and S1-U interface and connected with the NG core through NG2 and NG3 interfaces. The latter case means that eLTE is connected with the NG core through NG2 and NG3 interfaces. In the following description, eLTE means a base station corresponding to any one of the above connection methods.

Figure 9:
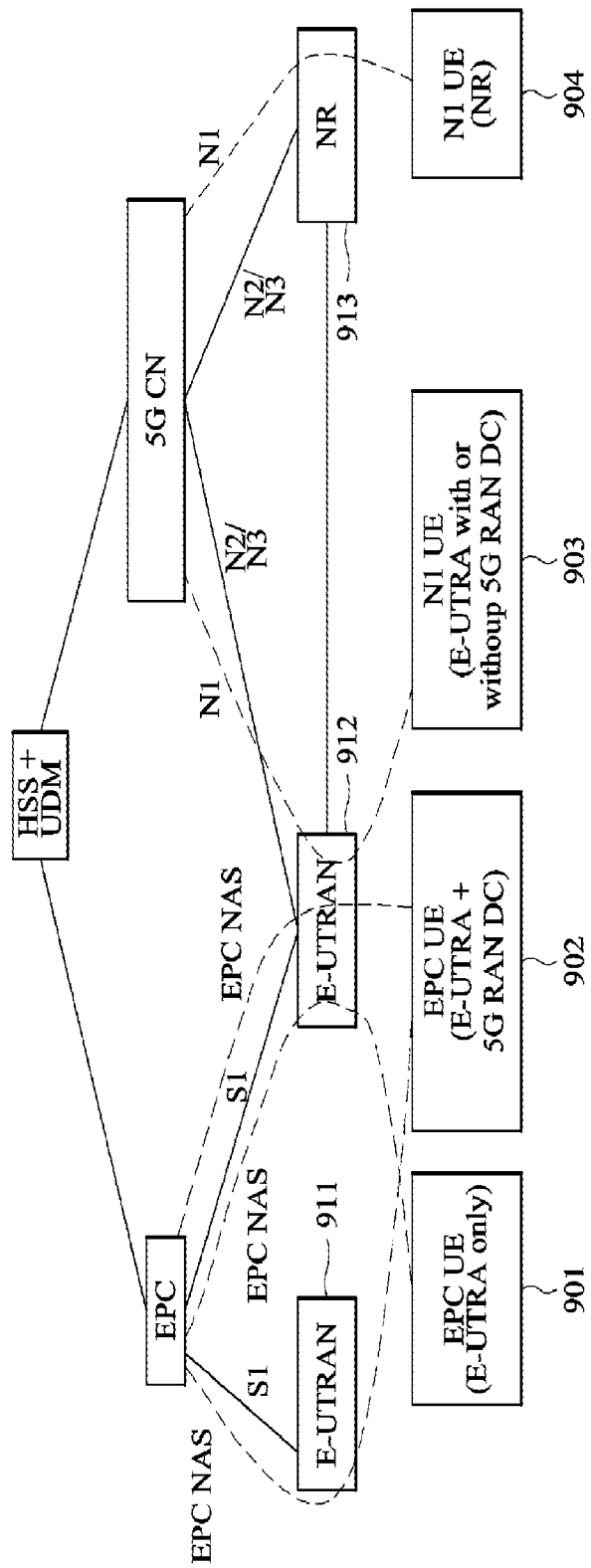

FIG. 9 illustrates various cases that eLTE is connected with the EPC and the NG core. Referring to FIG. 9, E-UTRAN 912 shown at a middle portion is connected to both the EPC and the NG core. A UE (that is, EPC UE (E-UTRA only)) 901 shown at the left-most side is a UE which does not support NG NAS. A UE (that is, EPC UE (E-UTRA+5G RAN DC)) 902 shown at the second left side is a UE which does not support NG NAS. The UE supports 5G RAN through Dual Connectivity but is a UE which supports EPC NAS only in case of NAS. A UE (that is, N1 UE (NR)) 904 shown at the right-most side is a UE which supports NG NAS only. A UE (that is, N1 UE (E-UTRAN with or without 5G RAN DC) 903 shown at the second right side is a UE which supports NG NAS, and supports a case that E-UTRAN and 5G RAN are Dual Connectivity as well as a single case of E-UTRAN. Also, the UE basically supports E-UTRAN, and generally supports EPC NAS to receive service even in the LTE connected with EPC.

Hereinafter, in various connection scenarios as shown in FIG. 9, various embodiments as to how eLTE efficiently supports NAS will be described.

EMBODIMENT

First of all, a method for supporting NAS signaling when eLTE is connected with both of EPC and NG core will be described. The UE may be a UE which supports NG NAS or a UE which does not support NG NAS.

Figure 10:
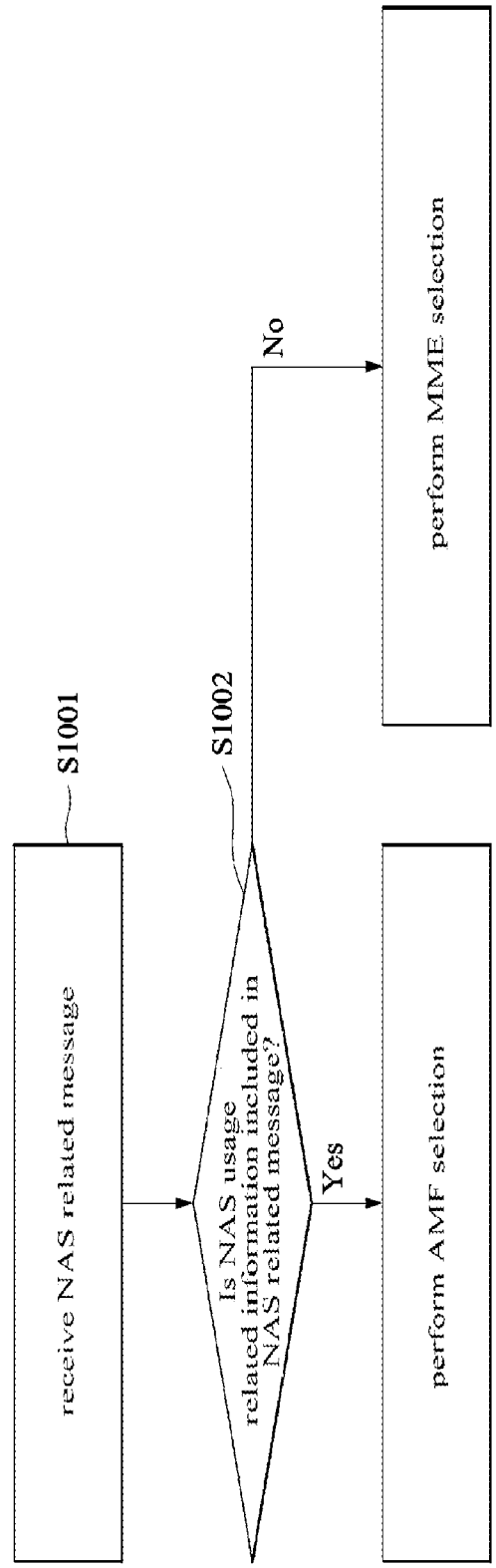
FIGS. 10 and 11 are diagrams illustrating the embodiment of the present invention.

The base station may receive NAS-related message from the UE and perform MME selection or AMF selection depending on whether NAS usage related information is included in the NAS-related message. In this case, the NAS usage related information may be information indicating that NG (Next generation) NAS is used or information indicating that EPC NAS is not used. A flow chart of an operation of the base station is shown in FIG. 10. Referring to FIG. 10, the base station receives the NAS-related message (S1001) and determines whether the NAS usage related information is included in the NAS-related message (S1002). If the NAS usage related information is included in the NAS-related message, AMF selection may be performed, and if not so, MME selection may be performed.

Figure 11:
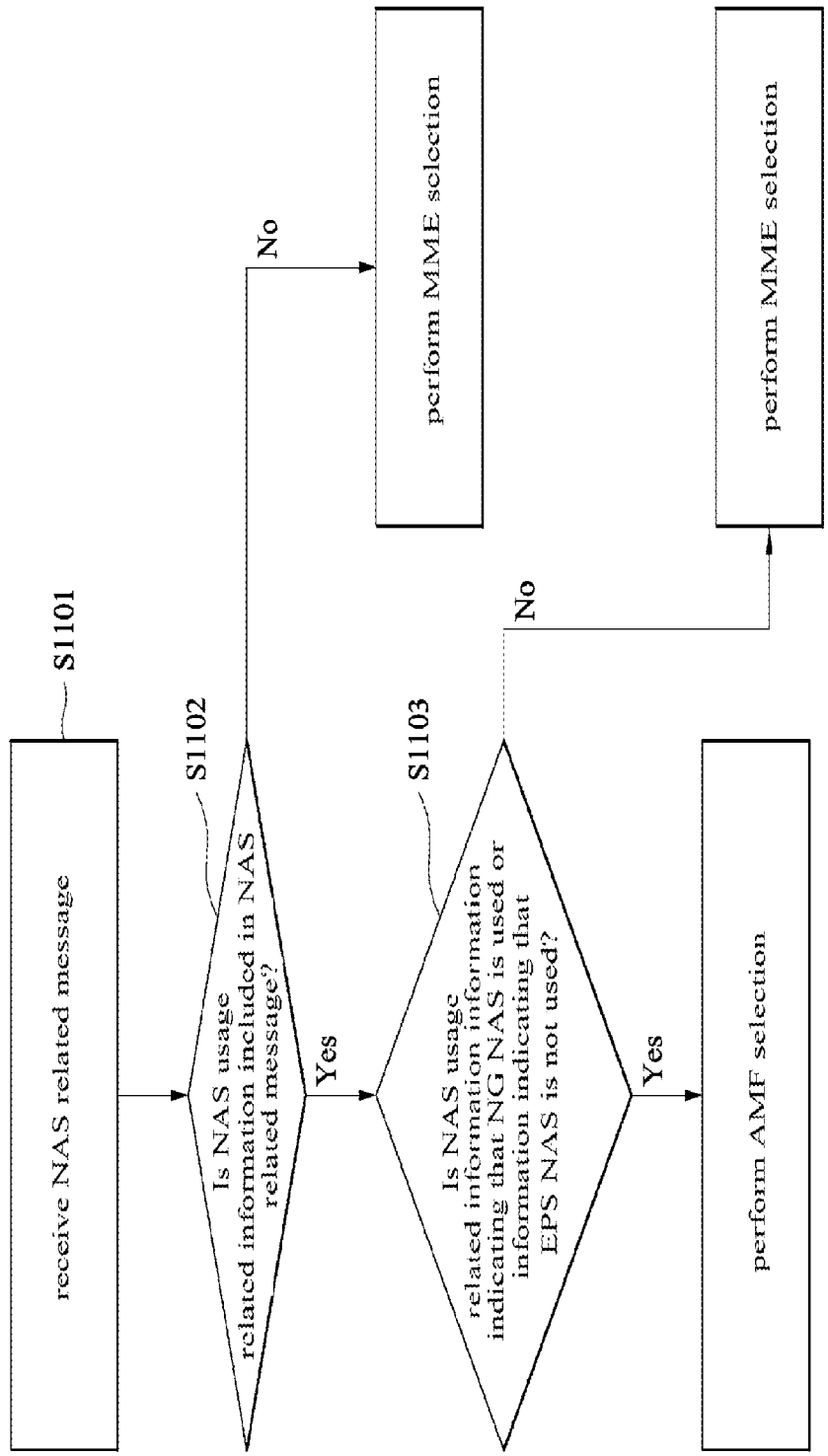

Alternatively, unlike the above case, as shown in FIG. 11, the base station receives the NAS-related message (S1001), and determines whether the NAS usage related information is included in the NAS-related message (S1002). If the NAS usage related information is not included in the NAS-related message, the base station performs MME selection. If the NAS usage related information is included in the NAS-related message, the base station determines/tests that the NAS usage related information is information indicating that NG NAS is used or information indicating that EPC NAS is not used (S1103). The base station performs AMF selection or MME selection in accordance with the determined result. If the NAS usage related information is included in the NAS-related message and is information indicating that NG NAS is used or information indicating that EPC NAS is not used, the base station performs AMF selection. If the NAS usage related information is included in the NAS-related message and is information indicating that NG NAS is not used or information indicating that EPC NAS is used, the base station performs MME selection.

In short, eLTE determines whether a type of a serving node of the UE is MME or function (that is, AMF) of the NG core by construing the presence of the NAS usage related information and meaning indicated by the NAS usage related information if the NAS usage related information exists. If the type of the serving node is determined as MME (this is the case that there is no NAS usage related information or it is construed that NG NAS is not used even if there is NAS usage related information), eLTE performs an operation for actually selecting a serving MME of the UE. If the type of the serving node of the UE is determined as the function of the NG core (this is the case that there is NAS usage related information or it is construed that NG NAS is used when there is NAS usage related information), eLTE performs an operation for actually selecting a serving NG core function of the UE.

Afterwards, the eLTE may transfer the NAS message to the MME or the AMF determined as a result of MME selection or AMF selection.

In the aforementioned description, AMF selection may include one or more of selection of a function of the NG core as a serving node of the UE, selection of the AMF as a serving node of the UE, transmission of the NAS message to the function of the NG core, transmission of the NAS message through N2 interface and transmission of the NAS message through an interface connected to the AMF. MME selection may include one or more of selection of a node of the EPC as a serving node of the UE, selection of the MME as a serving node of the UE, transmission of the NAS message to the MME, and transmission of the NAS message through N1 interface.

Subsequently, the case that eLTE is connected to the NG core only will be described.

If there is no NAS usage related information, the base station may perform one or more of operations such as i) selection of a function, which may process EPC NAS, from the NG core, ii) transmission of the NAS message from the NG core to the function, which may process EPC NAS, at this time the transmission including explicit or implicit transmission of additional information indicating that the NAS message is not NG NAS or indicating that the NAS message is EPC NAS to the function, iii) transmission of the NAS message from the NG core to the function (this may be a function that may actually understand and process NAS, or may be a function serving to select/transfer a function, which may receive NAS from an access network and process the received NAS), which processes NAS (at this time, additional information indicating that the NAS message is not NG NAS or indicating that the NAS message is EPC NAS may explicitly or implicitly be transmitted to the function).

If there is NAS usage related information, the base station may perform one or more of operations such as transmission of the NAS message from the NG core to the function, which may process NG NAS (at this time, additional information indicating that the NAS message is NG NAS or indicating that the NAS message is not EPC NAS may explicitly or implicitly be transmitted to the function), and iii) transmission of the NAS message from the NG core to the function (this may be a function that may actually understand and process NAS, or may be a function serving to select/transfer a function, which may receive NAS from an access network and process the received NAS), which processes NAS (at this time, additional information indicating that the NAS message is NG NAS or indicating that the NAS message is not EPC NAS may explicitly or implicitly be transmitted to the function).

When the eLTE performs the above-described operation, that is, selects a core network function and/or transmits NAS message to the core network function, if the eLTE is shared by a plurality of PLMNs, the eLTE selects the core network function corresponding to PLMN (or serving PLMN) selected by the UE or transmits the NAS message to the core network function corresponding to the PLMN (or serving PLMN) selected by the UE.

In the aforementioned description, the NAS-related message may be RRC (Radio Resource Control) message. If a UE (UE which supports both EPC NAS and NG NAS or UE which supports NG NAS only without supporting EPC NAS) determines to use NG NAS, the UE explicitly or implicitly includes information indicating that NG NAS is used in RRC message when transmitting the RRC message. The RRC message may be RRC message which includes NG NAS or RRC message which does not include NG NAS. Instead of information indicating the NG NAS is used, information indicating that EPC NAS is not used may be included in the RRC message. The information indicating that the NG NAS is used or EPC NAS is not used may be indicated by including the NG NAS in the RRC message after defining and adding a new IE (Information Element), flag, field, parameter, etc. and/or defining a new IE for including NG NAS instead of the legacy DedicatedInfo-NAS, for example, IE such as DedicatedInfoNextgenNAS.

The legacy DedicatedInfoNAS information element included in the RRC message is as listed in Table 2 and follows the description of TS 36.331.

TABLE 2

DedicatedInfoNAS

The IE DedicatedInfoNAS is used to transfer UE specific NAS layer information between the network and the UE. The RRC layer is transparent for this information.DedicatedInfoNAS information element— ASN1STARTDedicatedInfoNAS ::=OCTET STRING— ASN1STOP AS layer of the UE may provide NAS layer with connection support information to the NG core, which is provided from eLTE, to determine that the UE which supports NG NAS may use NG NAS. The NAS layer may NG NAS layer, or may be NAS layer which commonly manages EPC NAS and NG NAS. In case of network sharing in which the eLTE is shared by a plurality of PLMNs, the AS layer of the UE may provide the NAS layer with connection support information to the NG core for the selected PLMN, or may provide the NAS layer with connection support information to the NG core per PLMN.

Meanwhile, despite that the eLTE supports connection to the NG core and the UE supports NG NAS, the UE may explicitly or implicitly include information indicating that the NG NAS is not used in the RRC message in accordance with the information acquired from the eLTE when transmitting the RRC message. The RRC message may be RRC message which includes NG NAS, or may be RRC message which does not include NG NAS. Instead of information indicating the NG NAS is not used, information indicating that EPC NAS is used may be included in the RRC message. The information indicating that the NG NAS is not used or EPC is used may be indicated by defining and adding a new IE, flag, field, parameter, etc. in and to the RRC message.

As described above, despite that the UE supports NG NAS (that is, despite that NG NAS function is implemented), various reasons why that NG NAS is not used may be notified to the network. A main example of the various reasons may include a case that service cannot be received from the NG core in a visited PLMN where the UE is roaming if a function of the UE, which is operated as NG NAS, is disabled.

If LTE base station does not support NG NAS, the UE determines that NG NAS is not used and EPC NAS is used. In this case, the UE performs the legacy RRC operation and NAS transmission operation as they are.

If the eLTE is shared by a plurality of PLMNs, the UE may explicitly (PLMN ID) or implicitly (PLMN ID is implicit in ID information of the UE) include selected PLMN information in the RRC message when transmitting the RRC message. For this reason, the eLTE may determine a serving PLMN selected by the UE.

The UE (that is, UE which supports EPC NAS) which does not support NG NAS performs the legacy RRC operation and NAS transmission operation (TS 23.401, TS 24.301, TS 36.331, etc.) as they are. This means that NAS message is transmitted by being included in IE (that is, DedicatedInfoNAS of TS 36.331) which includes NAS of the RRC message regardless of the case whether the LTE base station supports NG NAS.

Meanwhile, if the eLTE supports connection to the NG core, the eLTE may explicitly or implicitly notify the UE of one or more of i) information indicating connection to the NG core is supported and ii) information indicating that the network supports NG NAS. This may be a type of SIB (System Information Block) or a dedicated signaling type transmitted to the UE. If the eLTE supports network sharing (that is, if the eLTE is shared by a plurality of PLMNs), the eLTE may provide each PLMN with the above information suitable for each PLMN. For example, if the eLTE is shared by PLMN #1, PLMN #2, and PLMN #3, and if the eLTE is connected to the EPC and the NG core in case of PLMN #1 is connected to the EPC only in case of PLMN #2 and connected to the NG core only in case of PLMN #3, the eLTE may provide information indicating PLMN #1 and PLMN #3 support connection to the NG core. This means that the above information may be provided per PLMN.

Figure 12:
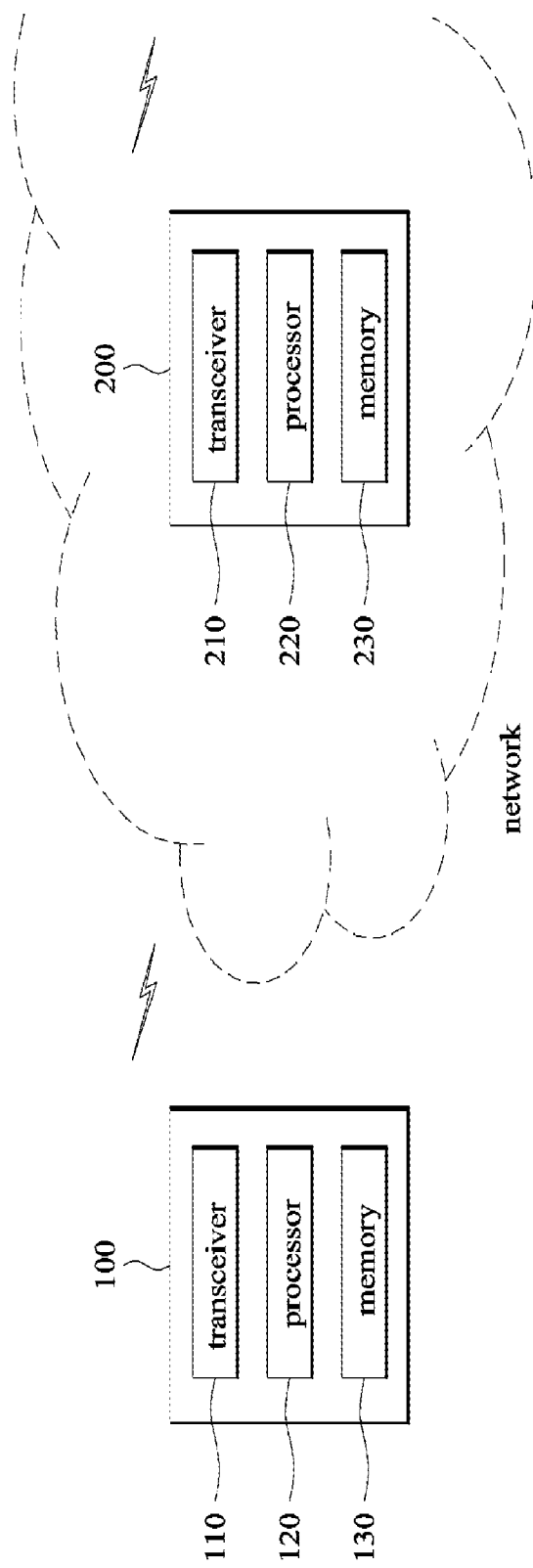
FIG. 12 is a diagram a configuration of a network node apparatus according to the embodiment of the present invention.

FIG. 12 is a diagram illustrating a configuration of a network node apparatus according to the embodiment of the present invention.

Referring to FIG. 12, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. The memory 130 may store the operation-processed information for a predetermined time, and may be replaced with a buffer (not shown). Also, the processor 120 may be configured to perform a UE operation suggested in the present invention.

Referring to FIG. 12, the network node apparatus 200 according to the present invention may include a transceiving module 210, a processor 220, and a memory 230. The transceiving module 210 may be configured to transmit various signals, data and information to an external device and to receive various signals, data and information from the external device. The network node apparatus 200 may be connected with the external device through the wire and/or wireless. The processor 220 may control the overall operation of the network node apparatus 200, and may be configured to allow the network node apparatus 200 to perform a function of operation-processing information to be transmitted to and received from the external device. The memory 230 may store the operation-processed information for a predetermined time, and may be replaced with a buffer (not shown). Also, the processor 220 may be configured to perform a network node operation suggested in the present invention. In detail, the processor 220 may receive NAS-related message through the transceiving module, perform MME selection or AMF selection depending on whether the NAS usage related information is included in the NAS-related message, and transfer NAS message to MME or AMF determined as a result of MME selection or AMF selection.

Also, the details of the aforementioned UE 100 and the aforementioned network node apparatus 200 may be configured in such a manner that the aforementioned various embodiments of the present invention may independently be applied to the aforementioned UE 100 and the aforementioned network node apparatus 200, or two or more embodiments may simultaneously be applied to the aforementioned UE 100 and the aforementioned network node apparatus 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may equally be applied to various mobile communication systems.

The invention claimed is:

1. A method related to non-access stratum (NAS) signaling of a user equipment (UE) in a wireless communication system, the method comprising the steps of:
    receiving, by the UE from the base station, information informing the UE that the base station supports a connection to a next generation (NG) core;
    transmitting, by the UE to the base station, a NAS related-RRC message;
    wherein, based on the NAS related-RRC message including NAS usage related information indicating that NG NAS is used for the connection to the NG core, a NAS message is delivered to an access and mobility management function (AMF).

2. The method according to claim 1, wherein the NAS usage related information indicates that NG NAS is used and an evolved packet core (EPC) NAS is not used.

3. The method according to claim 1, wherein the AMF is selected based on the NAS usage related information for the connection to the NG core.

4. The method according to claim 1, wherein, based on the NAS related-RRC message not including the NAS usage related information for the connection to the NG core, the NAS message is delivered to a mobility management entity (MME).

5. The method according to claim 1, wherein the base station is connected to both of an evolved packet Core (EPC) and NG core.

6. An a user equipment (UE) capable of non-access stratum (NAS) signaling in a wireless communication system, the UE comprising:
- at least one processor; and
- at least one computer memory operatively coupled to the at least one processor and storing instructions which, when executed, cause the at least one processor to perform operations,
- wherein the operations include receiving, by the UE from the base station, information informing the processor that the base station supports a connection to a next generation (NG) core;
- transmitting, by the UE to the base station, a NAS related-RRC message; and
- wherein, based on the NAS related-RRC message including NAS usage related information indicating that NG NAS is used for the connection to the NG core, a NAS message is delivered to an access and mobility management function (AMF).

7. The UE according to claim 6, wherein the NAS usage related information indicates that NG NAS is used and an evolved packet core (EPC) NAS is not used.

8. The UE according to claim 6, wherein the AMF is selected based on the a NAS usage related information for the connection to the NG core.

9. The UE according to claim 6, wherein, based on the NAS related-RRC message not including the NAS usage related information for the connection to the NG core, the NAS message is delivered to a mobility management entity (MME).

10. The UE according to claim 6, wherein the base station is connected to both of an evolved packet Core (EPC) and NG core.

11. A method related to non-access stratum (NAS) signaling of a base station in a wireless communication system, the method comprising the steps of:
- transmitting, by the base station and to a user equipment (UE), information informing the UE that the base station supports a connection to a next generation (NG) core;
- receiving, by the base station and from the UE, a NAS related-RRC message;
- wherein, based on the NAS related-RRC message including NAS usage related information indicating that NG NAS is used for the connection to the NG core, a NAS message is delivered to an access and mobility management function (AMF).

12. The method according to claim 11, wherein the NAS usage related information indicates that NG NAS is used and an evolved packet core (EPC) NAS is not used.

13. The method according to claim 11, wherein the AMF is selected based on the NAS usage related information for the connection to the NG core.

14. The method according to claim 11, wherein, based on the NAS related-RRC message not including the NAS usage related information for the connection to the NG core, the NAS message is delivered to a mobility management entity (MME).

15. The method according to claim 11, wherein the base station is connected to both of an evolved packet Core (EPC) and NG core.

16. A base station capable of non-access stratum (NAS) signaling in a wireless communication system, the base station comprising:
- a transceiver; and
- a processor, operatively coupled to the transceiver, configured to:
  - control the transceiver to transmit, to a user equipment (UE), information informing the UE that the base station supports a connection to a next generation (NG) core, and
  - control the transceiver to receive, from the UE, a NAS related-RRC message,
  - wherein, based on the NAS related-RRC message including a NAS usage related information indicating that NG NAS is used for the connection to the NG core, a NAS message is delivered to an access and mobility management function (AMF).

17. The base station of claim 16, wherein the NAS usage related information indicates that NG NAS is used and an evolved packet core (EPC) NAS is not used.

18. The base station of claim 16, wherein the AMF is selected based on the NAS usage related information for the connection to the NG core.

19. The base station of claim 16, wherein, based on the NAS related-RRC message not including the NAS usage related information for the connection to the NG core, the NAS message is delivered to a mobility management entity (MME).

20. The base station of claim 16, wherein the base station is connected to both of an evolved packet Core (EPC) and NG core.

* * * * *